United States Patent
Jin et al.

(10) Patent No.: US 11,753,012 B2
(45) Date of Patent: Sep. 12, 2023

(54) SYSTEMS AND METHODS FOR CONTROLLING THE OPERATION OF AN AUTONOMOUS VEHICLE USING MULTIPLE TRAFFIC LIGHT DETECTORS

(71) Applicant: Toyota Research Institute, Inc., Los Altos, CA (US)

(72) Inventors: Hai Jin, Ann Arbor, MI (US); Shunsho Kaku, Mountain View, CA (US); Yutaka Taruoka, Tenpaku (JP); Kun-Hsin Chen, Mountain View, CA (US); Peiyan Gong, Ann Arbor, MI (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 225 days.

(21) Appl. No.: 17/039,156

(22) Filed: Sep. 30, 2020

(65) Prior Publication Data

US 2022/0097708 A1    Mar. 31, 2022

(51) Int. Cl.
*B60W 30/18* (2012.01)
*H04W 4/44* (2018.01)
*G06V 20/58* (2022.01)

(52) U.S. Cl.
CPC ..... *B60W 30/18159* (2020.02); *G06V 20/584* (2022.01); *H04W 4/44* (2018.02); *B60W 2556/55* (2020.02)

(58) Field of Classification Search
CPC ........... B60W 30/18159; B60W 40/04; B60W 2556/55; B60W 2556/45; G06V 20/58;
(Continued)

(56) References Cited

U.S. PATENT DOCUMENTS 10,276,043 B2 * 4/2019 Vijaya Kumar ..... G08G 1/0116
10,300,894 B2 * 5/2019 Rawashdeh ............ G06V 10/56
(Continued)

OTHER PUBLICATIONS

Ginsberg, "Traffic Signals and Autonomous Vehicles: Vision-Based or a V2I Approach?," Connected Signals, Inc., 2016, found at http://kresttechnology.com/krest-academic-projects/krest-major-projects/ECE/BTech%20%20Major%20ECE%20EMBEDDED%202016-17/Btech%20ECE%20Embedded%20Major%20BP%202016-17/84.Optimal%20Vehicle%20Communication%20Near.pdf.
(Continued)

*Primary Examiner* — Russell Frejd
*Assistant Examiner* — Brandon Z Willis
(74) *Attorney, Agent, or Firm* — Christopher G. Darrow; DARROW MUSTAFA PC

(57) ABSTRACT

Systems and methods for controlling the operation of an autonomous vehicle are disclosed herein. One embodiment performs traffic light detection at an intersection using a sensor-based traffic light detector to produce a sensor-based detection output, the sensor-based detection output having an associated first confidence level; performs traffic light detection at the intersection using a vehicle-to-infrastructure-based (V2I-based) traffic light detector to produce a V2I-based detection output, the V2I-based detection output having an associated second confidence level; performs one of (1) selecting as a final traffic-light-detection output whichever of the sensor-based detection output and the V2I-based detection output has a higher associated confidence level and (2) generating the final traffic-light-detection output by fusing the sensor-based detection output and the V2I-based detection output using a first learning-based classifier; and controls the operation of the autonomous vehicle based, at least in part, on the final traffic-light-detection output.

17 Claims, 5 Drawing Sheets

(58) Field of Classification Search
CPC .... G06V 20/584; G06V 10/80; G06V 10/806; G06V 10/82; H04W 4/44
See application file for complete search history.

(56) References Cited

U.S. PATENT DOCUMENTS

| | | | |
|---|---|---|---|
| 10,685,247 B2* | 6/2020 | Bhatia | H04L 67/00 |
| 11,373,519 B2* | 6/2022 | Grimm | G08G 1/07 |
| 2018/0121763 A1* | 5/2018 | Surnilla | G06V 10/809 |
| 2018/0322785 A1* | 11/2018 | Jerichow | G08G 1/162 |
| 2021/0158062 A1* | 5/2021 | Yu | G01C 21/30 |
| 2021/0179135 A1* | 6/2021 | Ahn | G08G 1/096741 |
| 2021/0316750 A1* | 10/2021 | Jo | B60W 50/14 |
| 2022/0101728 A1* | 3/2022 | Wolf | H04W 4/44 |

OTHER PUBLICATIONS

Von Amim et al., "Cooperative Road Sign and Traffic Light Using Near Infrared Identification and Zigbee Smartdust Technologies," Computing Science, Newcastle University Technical Report Series, Mar. 2008, found at https://eprint.ncl.ac.uk/file_store/production/161041/0A0EF11F-AFA8-4D30-84A2-2E054E07707C.pdf.
García-Garrido et al., "Complete Vision-Based Traffic Sign Recognition Supported by an I2V Communication System," Sensors 2012, found at https://www.mdpi.com/1424-8220/12/2/1148/pdf.

* cited by examiner

SYSTEMS AND METHODS FOR CONTROLLING THE OPERATION OF AN AUTONOMOUS VEHICLE USING MULTIPLE TRAFFIC LIGHT DETECTORS

TECHNICAL FIELD

The subject matter described herein generally relates to autonomous vehicles and, more particularly, to systems and methods for controlling the operation of an autonomous vehicle using multiple traffic light detectors.

BACKGROUND

Traffic light detection is an important part of fully autonomous driving, particularly in urban environments. Such environments have many signalized intersections through which an autonomous vehicle must navigate. The autonomous vehicle needs to be able to detect traffic lights and their current states (e.g., green, yellow, or red) to decide whether to stop or proceed or whether it is permissible to turn at a particular time and in a particular direction. Traffic light detection is a challenging task that is the subject of ongoing research and development in the automotive industry.

SUMMARY

An example of a system for controlling operation of an autonomous vehicle is presented herein. The system comprises one or more processors and a memory communicably coupled to the one or more processors. The memory stores a sensor-based traffic light detection module including instructions that when executed by the one or more processors cause the one or more processors to perform sensor-based traffic light detection at an intersection to produce a sensor-based detection output, the sensor-based detection output having an associated first confidence level. The memory also stores a vehicle-to-infrastructure-based (V2I-based) traffic light detection module including instructions that when executed by the one or more processors cause the one or more processors to perform V2I-based traffic light detection at the intersection to produce a V2I-based detection output, the V2I-based detection output having an associated second confidence level. The memory also stores a fusion module including instructions that when executed by the one or more processors cause the one or more processors to perform one of (1) selecting as a final traffic-light-detection output whichever of the sensor-based detection output and the V2I-based detection output has a higher associated confidence level and (2) generating the final traffic-light-detection output by fusing the sensor-based detection output and the V2I-based detection output using a first learning-based classifier. The memory also stores a control module including instructions that when executed by the one or more processors cause the one or more processors to control the operation of the autonomous vehicle based, at least in part, on the final traffic-light-detection output.

Another embodiment is a non-transitory computer-readable medium for controlling operation of an autonomous vehicle and storing instructions that when executed by one or more processors cause the one or more processors to perform sensor-based traffic light detection at an intersection to produce a sensor-based detection output, the sensor-based detection output having an associated first confidence level. The instructions also cause the one or more processors to perform vehicle-to-infrastructure-based (V2I-based) traffic light detection at the intersection to produce a V2I-based detection output, the V2I-based detection output having an associated second confidence level. The instructions also cause the one or more processors to perform one of (1) selecting as a final traffic-light-detection output whichever of the sensor-based detection output and the V2I-based detection output has a higher associated confidence level and (2) generating the final traffic-light-detection output by fusing the sensor-based detection output and the V2I-based detection output using a first learning-based classifier. The instructions also cause the one or more processors to control the operation of the autonomous vehicle based, at least in part, on the final traffic-light-detection output.

In another embodiment, a method of controlling operation of an autonomous vehicle is disclosed. The method comprises performing traffic light detection at an intersection using a sensor-based traffic light detector to produce a sensor-based detection output, the sensor-based detection output having an associated first confidence level. The method also includes performing traffic light detection at the intersection using a vehicle-to-infrastructure-based (V2I-based) traffic light detector to produce a V2I-based detection output, the V2I-based detection output having an associated second confidence level. The method also includes performing one of (1) selecting as a final traffic-light-detection output whichever of the sensor-based detection output and the V2I-based detection output has a higher associated confidence level and (2) generating the final traffic-light-detection output by fusing the sensor-based detection output and the V2I-based detection output using a first learning-based classifier. The method also includes controlling the operation of the autonomous vehicle based, at least in part, on the final traffic-light-detection output.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
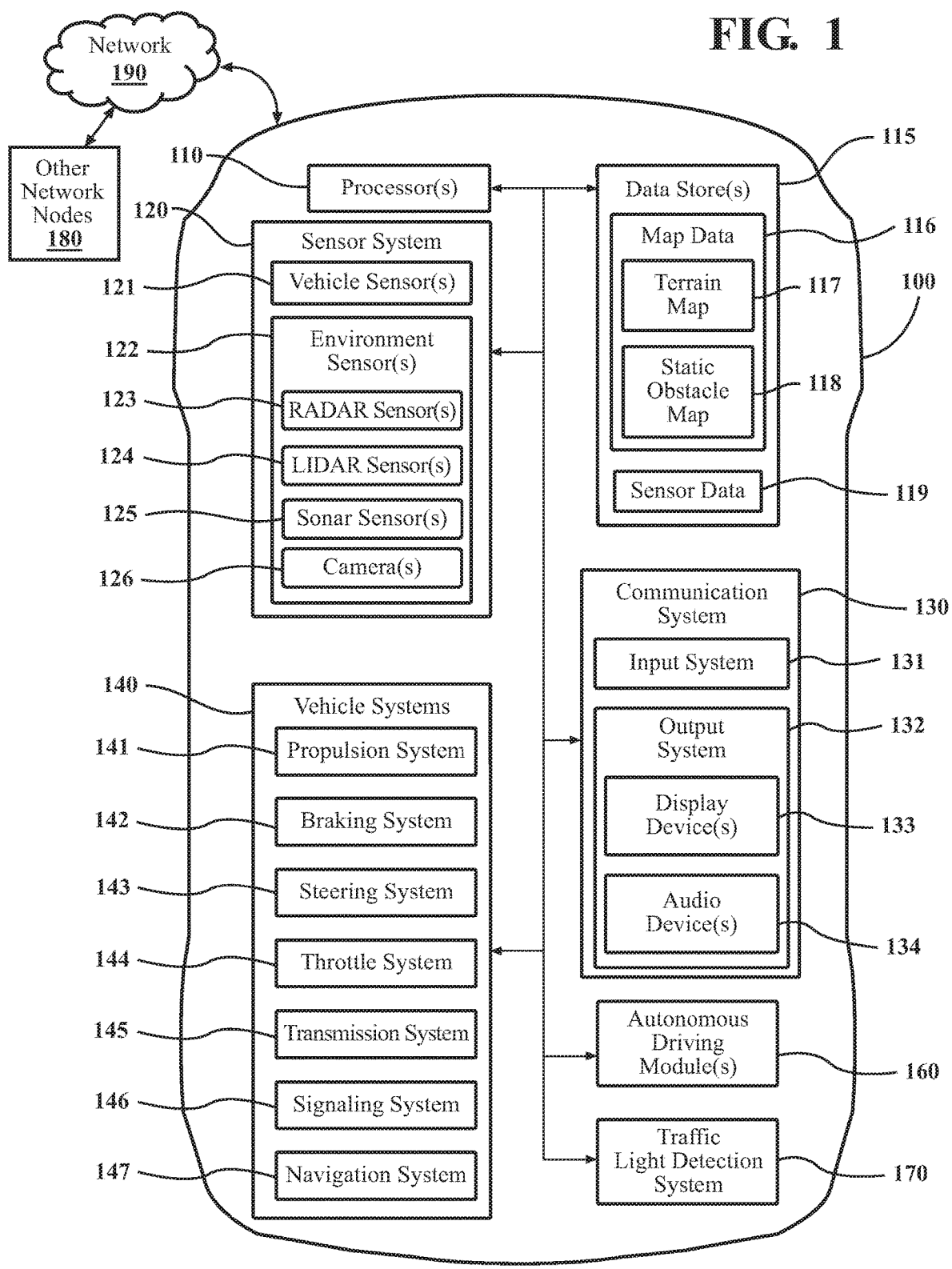
FIG. 1 illustrates one embodiment of a vehicle within which systems and methods disclosed herein may be implemented.

One approach to traffic light detection is sensor based. For example, some traffic light detectors rely on computer-vision techniques involving the analysis of image data from a vehicle's cameras. Another approach to traffic light detection is based on receiving vehicle-to-infrastructure (V2I) signals from the traffic lights themselves. The received V2I signals can include, for example, state information for various transitions (possible paths) through an intersection and, in some cases, timing information (e.g., how many seconds a given traffic light will remain in a particular state before its state changes).

Each approach, sensor-based detection and V2I-based detection, has advantages and disadvantages. For example, V2I-based traffic light detectors can provide accurate information regarding traffic light states (e.g., whether they are green, yellow, or red). Second, they can provide a traffic light's timing information (e.g., remaining seconds in a given state), which can help autonomous vehicles make safer and, in some cases, more fuel-economical decisions. Third, they can provide complete traffic-light state information at an intersection, including the states of traffic lights that are not visible to a vehicle's cameras due to view obstructions (trees, signs, etc.). Finally, V2I is generally not affected by weather or lighting conditions. V2I-based detectors also have a few disadvantages relative to sensor-based detectors. For example, the update rate can be slower, in some cases. Also, not all intersections include V2I communication capability. There is also the risk of V2I messages being dropped, corrupted (e.g., hacked), or lost.

In various embodiments discussed herein, a vehicle's traffic light detection system employs both a sensor-based traffic light detector and a V2I-based traffic light detector simultaneously to improve the accuracy and robustness of the system. The sensor-based traffic light detector produces a sensor-based detection output, and the V2I-based traffic light detector produces a V2I-based detection output. Each of the two detection outputs has an associated confidence level indicating how likely it is that the output in question is accurate and trustworthy. A fusion operation in the traffic light detection system then does one of the following, depending on the particular embodiment: (1) selects as the final traffic-light-detection output whichever of the sensor-based detection output and the V2I-based detection output has the higher associated confidence level or (2) generates the final traffic-light-detection output by fusing the sensor-based detection output and the V2I-based detection output using a learning-based classifier. The traffic light detection system can, via a control module, provide the final traffic-light-detection output to downstream control components of the vehicle (e.g., one or more autonomous driving modules) to control the operation of the autonomous vehicle (e.g., steering, acceleration, braking, etc.) based, at least in part, on the final traffic-light-detection output.

In some embodiments, the traffic light detection system uses one or more additional learning-based classifiers to assign a confidence level to the V2I-based detection output. In one embodiment, an additional learning-based classifier compares V2I signals that the vehicle receives from an intersection's information system with the vehicle's own environmental sensor data associated with the intersection (e.g., images depicting the intersection). Such a comparison can reveal how consistent the V2I signals and the environmental sensor data are to identify and reject incorrect V2I information. In another embodiment, past sensor-based detection output data and past V2I-based detection output data (e.g., 10 seconds' worth of each) are processed using a learning-based classifier to assign a confidence level to the V2I-based detection output. In some embodiments, these two techniques can be combined via a single learning-based classifier, or the outputs of two separate learning-based classifiers can be fused to output a single confidence-level value for the V2I-based detection output.

Referring to FIG. 1, an example of a vehicle 100, in which systems and methods disclosed herein can be implemented, is illustrated. As used herein, a "vehicle" is any form of motorized transport that is subject to traffic signals (e.g., traffic lights). In one or more implementations, the vehicle 100 can be an automobile. In some embodiments, vehicle 100 can operate, at least some of the time, in a fully autonomous mode (e.g., what the automotive industry refers to as autonomy Levels 3-5, particularly Level 5). The vehicle 100 can include the traffic light detection system 170 or capabilities to support or interact with the traffic light detection system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including traffic light detection system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 180 (information systems associated with intersections and their traffic lights, other infrastructure systems and devices, cloud servers, edge servers, user mobile devices, etc.) via communication system 130 and network 190.

Some of the possible elements of the vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126. One or more of these various types of environment sensors 122 can be used in detecting traffic lights, depending on the embodiment. In some of the embodiments described herein, image data from camera(s) 126 is of particular importance because those embodiments include a machine-vision-based traffic light detector that analyzes image data. Such a vision-based traffic light detector is one example of a sensor-based traffic light detector—a traffic light detector that detects traffic lights based on environmental sensor data from environment sensors 122.

Figure 2:
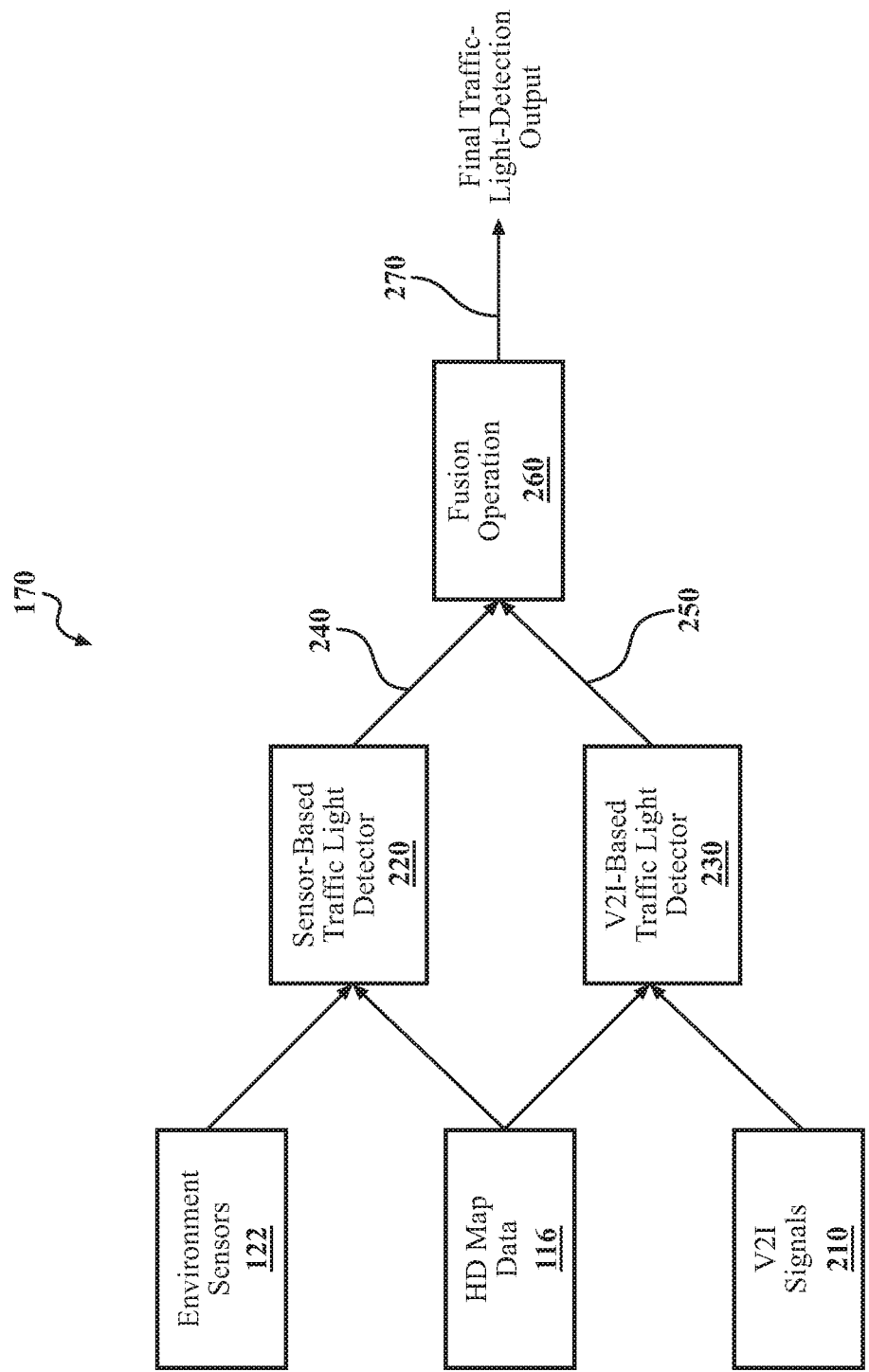
FIG. 2 is an overview block diagram of a traffic light detection system, in accordance with an illustrative embodiment of the invention.

Referring to FIG. 2, it is an overview block diagram of a traffic light detection system 170, in accordance with an illustrative embodiment of the invention. As shown in FIG. 2, sensor data from environment sensors 122 and high-definition (HD) map data 116 are input to a sensor-based traffic light detector 220. As mentioned above, in some embodiments, the sensor data is image data associated with (e.g., depicting) the intersection captured by one or more cameras 126, and sensor-based traffic light detector 220 detects traffic lights based on machine-vision techniques. For example, in one embodiment, sensor-based traffic light detector 220 uses a machine-learning bounding-box-based object detection algorithm that estimates the center point, width, and height of each visible "box" (signal housing) at the intersection that houses one or more traffic lights. Herein, a "traffic signal" is a device that includes one or more traffic lights. For example, one common type of traffic signal includes three vertically stacked traffic lights—a green light, a yellow light, and a red light, and one of those three lights is lighted at any one time.

The algorithm also identifies the current state or phase (color) of the respective traffic signals associated with the possible transitions (paths through the intersection) and the type or category of each detected traffic signal (e.g., simple traffic light, left-turn arrow, right-turn arrow, etc.). The algorithm also outputs a confidence level that estimates the trustworthiness of the sensor-based detection output 240 (i.e., the estimated states or phases corresponding to the various transitions associated with the intersection). In one embodiment, the algorithm mentioned above is implemented using a one-stage fully convolutional neural network (CNN). The confidence level mentioned above is one of the outputs produced by the CNN, in such an embodiment. In other embodiments, more traditional object-detection algorithms can be used. For example, algorithms employing techniques such as semantic segmentation and instance segmentation can be used.

Another aspect of sensor-based traffic light detector 220 is correlating the detected traffic lights with the HD map data 116 to match estimated traffic-light states with their corresponding lanes and transitions. For example, the HD map data can include information regarding the locations (e.g., GPS coordinates) of traffic signals and mapping those known traffic signals to the specific lanes they govern. Correlating this information with the traffic lights detected via the sensor data enables sensor-based traffic light detector 220 to determine which traffic light is which among the detected traffic lights and which transitions and lanes are associated with the respective estimated traffic-light states. The HD map data also assists vehicle 100 in estimating how far vehicle 100 is from the intersection.

As also shown in FIG. 2, HD map data 116 and V2I signals 210 are input to a V2I-based traffic light detector 230. V2I-based traffic light detector 230 receives, via V2I signals 210, transitions associated with the intersection, traffic-light states/phases corresponding to the respective transitions, and, in some embodiments, timing information such as Signal Phase and Timing (SpaT) information (e.g., remaining seconds) for at least some of the transitions. As those skilled in the art are aware, each intersection equipped with V2I capability includes a device (referred to herein as an "information system" for the intersection) that transmits the V2I signals 210 to vehicles 100 in the vicinity. In some embodiments, the V2I signals 210 are communicated to the vehicles 100 via a short-range communication link such as Dedicated Short-Range Communications (DSRC) or Bluetooth Low Energy (BLE). Each intersection typically has a unique identifier that can also be communicated to the vehicles 100 and correlated with HD map data 116. V2I-based traffic light detector 230 correlates the traffic-light information conveyed by the V2I signals 210 with the HD map data 116 to identify to which lanes the received transitions and traffic-light states/phases correspond. Based on this information and analysis, V2I-based traffic light detector 230 outputs a V2I-based detection output 250. V2I-based detection output 250 includes the various transitions associated with the intersection and their corresponding states. In some embodiments, the V2I-based detection output 250, in some embodiments, can also include state-timing information derived from the received SPaT data. This information can aid the downstream path planner in vehicle 100.

The sensor-based detection output 240 and the V2I-based detection output 250 and their respective confidence levels are fed to a fusion operation 260. Fusion operation 260 differs, depending on the particular embodiment. In one embodiment, fusion operation 260 selects as the final traffic-light-detection output 270 whichever of the sensor-based detection output 240 and the V2I-based detection output 250 has the higher associated confidence level. In another embodiment, fusion operation 260 generates the final traffic-light-detection output 270 by fusing (combining) the sensor-based detection output 240 and the V2I-based detection output 250 using a learning-based classifier. For example, the learning-based classifier can be a deep-neural-network (DNN) classifier, such as a fully convolutional neural network (CNN), or a non-DNN classifier, such as a support vector machine (SVM), depending on the particular embodiment.

In a variation of an embodiment in which fusion module 325 selects, as the final traffic-light-detection output 270, whichever of the sensor-based detection output 240 and the V2I-based detection output 250 has the higher associated confidence level, fusion module 325 includes additional override instructions that subject the output-selection instructions discussed above to being overridden based on consideration of the risk associated with a particular transition 430 through the intersection that the autonomous vehicle 100 plans to execute. For example, in one embodiment, fusion module 325 might decide to play it safe by slowing to a stop and not making a left-hand turn at an intersection despite the V2I-based detection output 250 indicating a green traffic-light state for that transition with a confidence of 85%, where the sensor-based detection output 240 indicates a red state for that same transition with a confidence of 80%. In this example, traffic light detection system 170 (specifically, fusion module 325) trusts the detection output with the lower confidence level based on an assessment that a left turn has a relatively high associated risk (e.g., compared with other maneuvers, such as a right turn). Thus, in this example, fusion module 325 overrides the usual decision that would have favored the detection output with the higher confidence level.

As discussed above, the traffic light detection system 170 can, via a control module (not shown in FIG. 2), provide the final traffic-light-detection output 270 to downstream control components of the vehicle (e.g., one or more autonomous driving modules 160) to control the operation of the autonomous vehicle 100 (e.g., steering, acceleration, braking, etc.) based, at least in part, on the final traffic-light-detection output 270.

In one embodiment, the refresh rate of both the sensor-based detection output 240 and the V2I-based detection output 250 is 10 Hz. In other embodiments, a slower or more rapid refresh rate can be employed, and the refresh rates of the two traffic light detectors is not necessarily the same.

Figure 3:
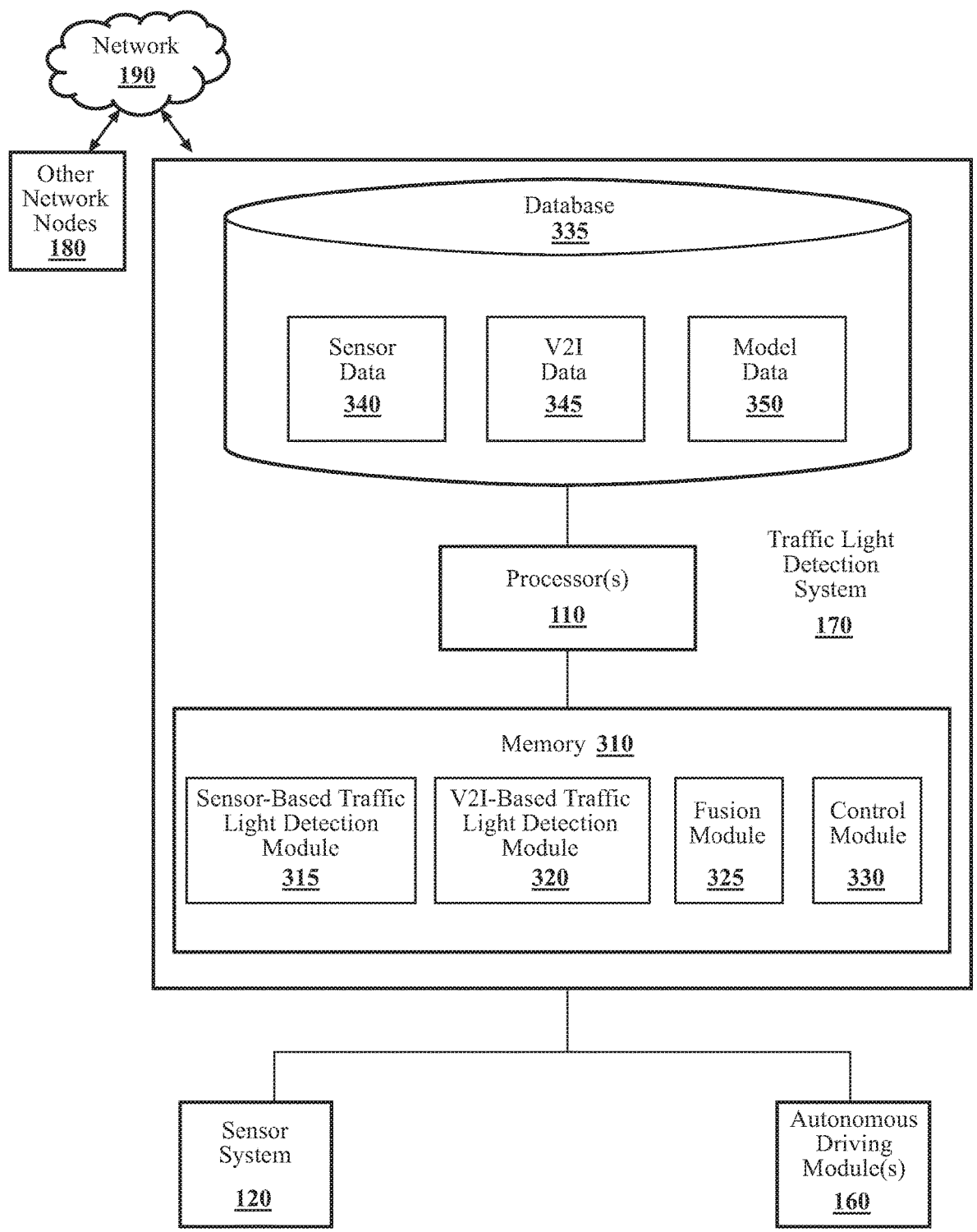
FIG. 3 is a functional block diagram of a traffic light detection system, in accordance with an illustrative embodiment of the invention.

Referring to FIG. 3, it is a functional block diagram of a traffic light detection system, in accordance with an illustrative embodiment of the invention. In this embodiment, traffic light detection system 170 is shown as including one or more processors 110 from the vehicle 100 of FIG. 1. In general, the one or more processors 110 may be a part of traffic light detection system 170, traffic light detection system 170 may include one or more separate processors from the one or more processors 110 of the vehicle 100, or traffic light detection system 170 may access the one or more processors 110 through a data bus or another communication path, depending on the embodiment.

In one embodiment, memory 310 stores a sensor-based traffic light detection module 315, a V2I-based traffic light detection module 320, a fusion module 325, and a control module 330. The memory 310 is a random-access memory (RAM), read-only memory (ROM), a hard-disk drive, a flash memory, or other suitable memory for storing the modules 315, 320, 325, and 330. The modules 315, 320, 325, and 330 are, for example, computer-readable instructions that when executed by the one or more processors 110, cause the one or more processors 110 to perform the various functions disclosed herein.

As shown in FIG. 3 and as discussed above, traffic light detection system 170 can communicate with one or more other network nodes 180 (information systems associated with intersections and their traffic lights, other infrastructure systems and devices, cloud servers, edge servers, user mobile devices, etc.) via the communication system 130 of vehicle 100 and network 190. Traffic light detection system 170 can also interface and communicate with sensor system 120 and autonomous driving module(s) 160. More specifically, traffic light detection system 170 can at least indirectly control the operation of vehicle 100 by conveying its final traffic light detection output 270 downstream to the autonomous driving module(s) 160, which ultimately control the steering, acceleration, and braking, etc., of a vehicle 100 in accordance with the vehicle's path planner.

Traffic light detection system 170 can store sensor data 340, V2I data 345 (the information derived from V2I signals 210), and model data 350 in a database 335. Model data 350 can include a variety of different kinds of data, intermediate results of calculations, etc., associated with the traffic-light detection algorithms employed by sensor-based traffic light detector 220 and V2I-based traffic light detector 230. As discussed above, traffic light detection system 170 also accesses HD map data 116 in connection with traffic light detection.

Sensor-based traffic light detection module 315 generally includes instructions that when executed by the one or more processors 110 cause the one or more processors 110 to perform traffic light detection at an intersection using a sensor-based traffic light detector 220 to produce a sensor-based detection output 240 having an associated confidence level. The techniques and implementation of sensor-based (e.g., image/vision-based) traffic light detection are discussed in greater detail above. As discussed above, the inputs to the sensor-based traffic light detector 220 include sensor data 340 and HD map data 116, and the sensor-based detection output 240 includes state/phase estimates for the various possible transitions associated with the intersection and an associated confidence level. As explained above, a "transition," in this context, is a path through the intersection, whether that path involves proceeding straight or turning. This is discussed further below in connection with FIG. 4. Each transition is governed by a traffic light, and sensor-based traffic light detector 220 detects the present state/phase of the respective traffic lights governing the transitions that are relevant to an ego vehicle (vehicle 100).

As discussed above, in some embodiments, the sensor data 340 includes image data associated with (e.g., depicting) the intersection that is captured by one or more cameras 126, and sensor-based traffic light detector 220 detects traffic lights and their associated states/phases based on machine-vision techniques, which include analyzing the image data associated with the intersection.

V2I-based traffic light detection module 320 generally includes instructions that when executed by the one or more processors 110 cause the one or more processors 110 to perform traffic light detection at the same intersection using a V2I-based traffic light detector 230 to produce a V2I-based detection output 250 having an associated confidence level. As discussed above, the inputs to the V2I-based traffic light detector 230 include V2I signals 210 from the intersection's information system and HD map data 116, and the V2I-based detection output 250 includes state/phase estimates for the various possible transitions associated with the intersection, an associated confidence level, and, in some embodiments, SPaT information.

As discussed above, how V2I-based traffic light detection module 320 assigns a confidence level to the V2I-based detection output 250 can vary, depending on the particular embodiment. In one embodiment, an additional learning-based classifier compares V2I data 345 that the vehicle receives from the intersection's information system with the vehicle's own environmental sensor data (sensor data 340) associated with the intersection. Such a comparison can reveal how consistent the V2I data 345 and the sensor data 340 are, making it possible to flag and possibly reject incorrect V2I data 345. In another embodiment, past sensor-based detection output data (240) and past V2I-based detection output data (250) are processed using a learning-based classifier to assign a confidence level to the V2I-based detection output 250. As mentioned above, in some embodiments, these two techniques can be combined via a single learning-based classifier, or the outputs of two separate learning-based classifiers can be fused to output a single confidence-level value for the V2I-based detection output 250.

Fusion module 325 generally includes instructions that when executed by the one or more processors 110 cause the one or more processors 110 to select between or combine the sensor-based detection output 240 and the V2I-based detection output 250, depending on the particular embodiment. Fusion module 325 is associated with the fusion operation 260 discussed above in connection with FIG. 2. In one embodiment, fusion module 325 selects as the final traffic-light-detection output 270 whichever of the sensor-based detection output 240 and the V2I-based detection output 250 has the higher associated confidence level. In a different embodiment, fusion operation 260 generates the final traffic-light-detection output 270 by fusing (combining) the sensor-based detection output 240 and the V2I-based detection output 250 using a learning-based classifier. As discussed above, the learning-based classifier can be a DNN classifier, such as a fully convolutional neural network (CNN), or a non-DNN classifier, such as a SVM, depending on the particular embodiment.

Control module 330 generally includes instructions that when executed by the one or more processors 110 cause the one or more processors 110 to control the operation of the autonomous vehicle 100 based, at least in part, on the final traffic-light-detection output 270. In some embodiments, control module 330 communicates the final traffic light detection output 270 to one or more downstream components of the vehicle 100 that control autonomous driving, such as autonomous driving module(s) 160. Autonomous driving module(s) 160 can control, for example, the steering, acceleration, and braking of vehicle 100 in accordance with a path planner of a vehicle 100. For example, the path planner can decide to slow down and stop, proceed straight, or turn depending on the final traffic light detection output 270 provided via control module 330.

Figure 4:
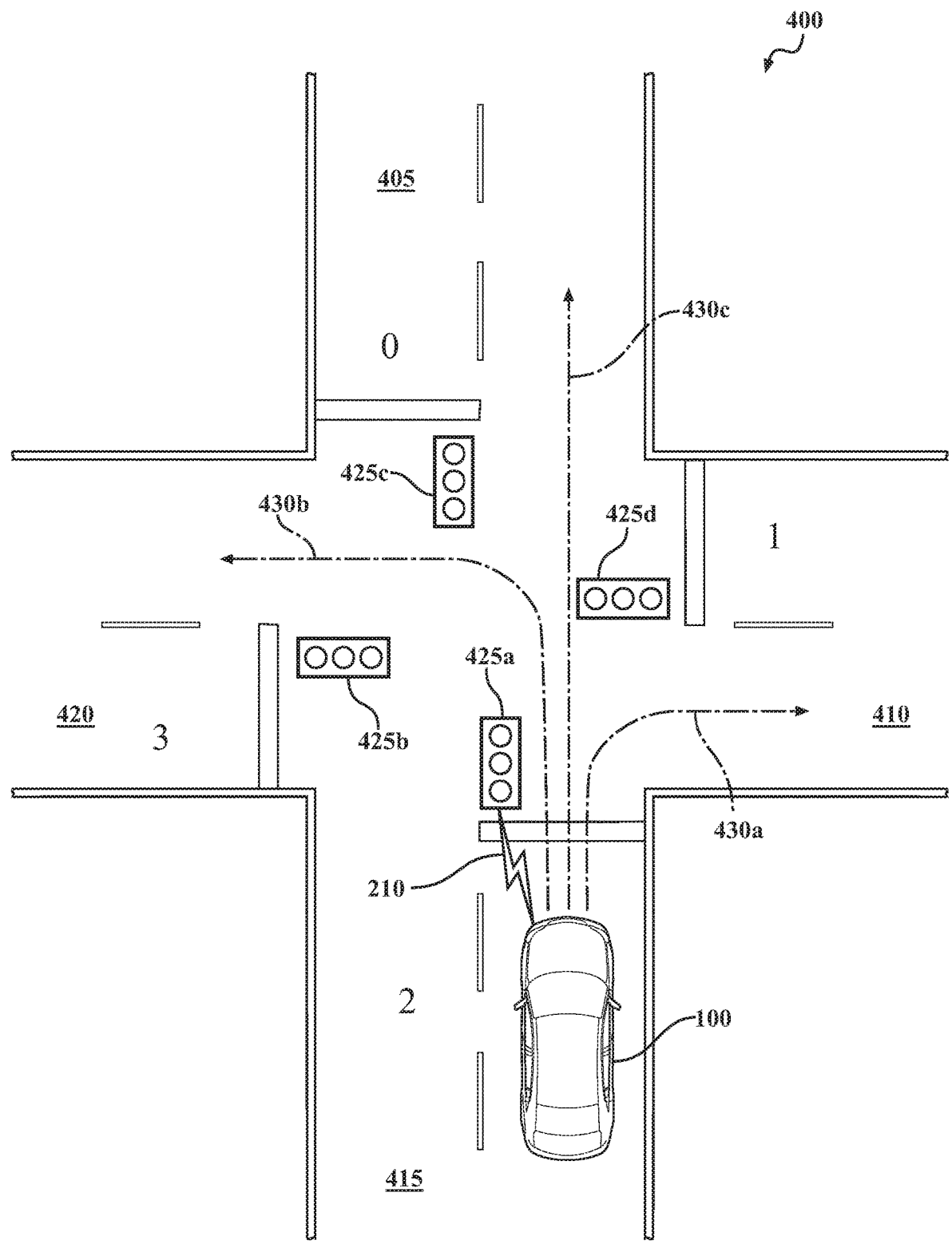
FIG. 4 illustrates an intersection at which an autonomous vehicle can deploy a traffic light detection system, in accordance with an illustrative embodiment of the invention.

FIG. 4 illustrates an intersection 400 at which an autonomous vehicle 100 can deploy a traffic light detection system 170, in accordance with an illustrative embodiment of the invention. In FIG. 4, a vehicle 100 (e.g., a fully autonomous vehicle) is approaching the intersection 400. In this embodiment, the information system associated with intersection 400 (not shown in FIG. 4) assigns a numerical identifier to each of the four branches of the intersection. In this example, the four branches as numbered as follows: Path 0 (405), Path 1 (410), Path 2 (415), and Path 3 (420). As shown in FIG. 4, vehicle 100 is traveling along Path 2 (415) toward Path 0 (405). Intersection 400 is governed by traffic light 425a, traffic light 425b, traffic light 425c, and traffic light 425d. From the perspective of vehicle 100, three transitions 430 (paths through intersection 400) are possible: a right-turn transition 430a (Path 2 to Path 1), a left-turn transition 430b (Path 2 to Path 3), and a proceed-straight transition 430c (Path 2 to Path 0). Each of those transitions is governed (controlled) by one of the traffic lights 425. In this simple example including branches that have only one lane in each direction, right-turn transition 430a, left-turn transition 430b, and proceed-straight transition 430c are all governed by traffic light 425a. For clarity, only the transitions pertaining to the ego vehicle (vehicle 100) are shown in FIG. 4. Analogous transitions apply to traffic traveling along the other branches of intersection 400 (i.e., Path 0 (405), Path 1 (410), and Path 3 (420)).

As also shown in FIG. 4, vehicle 100 can receive V2I signals 210 from the information system of intersection 400. The V2I data 345 derived from the V2I signals 210 is one of the inputs to the V2I-based traffic light detector 230 of traffic light detection system 170, as discussed above. V2I-based traffic light detector 230 uses the received V2I data 345 and HD map data 116 to produce estimates of the transitions and their associated traffic-light states (the states of the traffic lights that govern the respective transitions). As also discussed above, the sensor-based traffic light detector 220 of traffic light detection system 170 uses sensor data 340 and HD map data 116 to generate its own estimates of the transitions 430 and their associated traffic-light states. Two approaches to combining the sensor-based detection output 240 and the V2I-based detection output 250 are discussed above.

Figure 5:
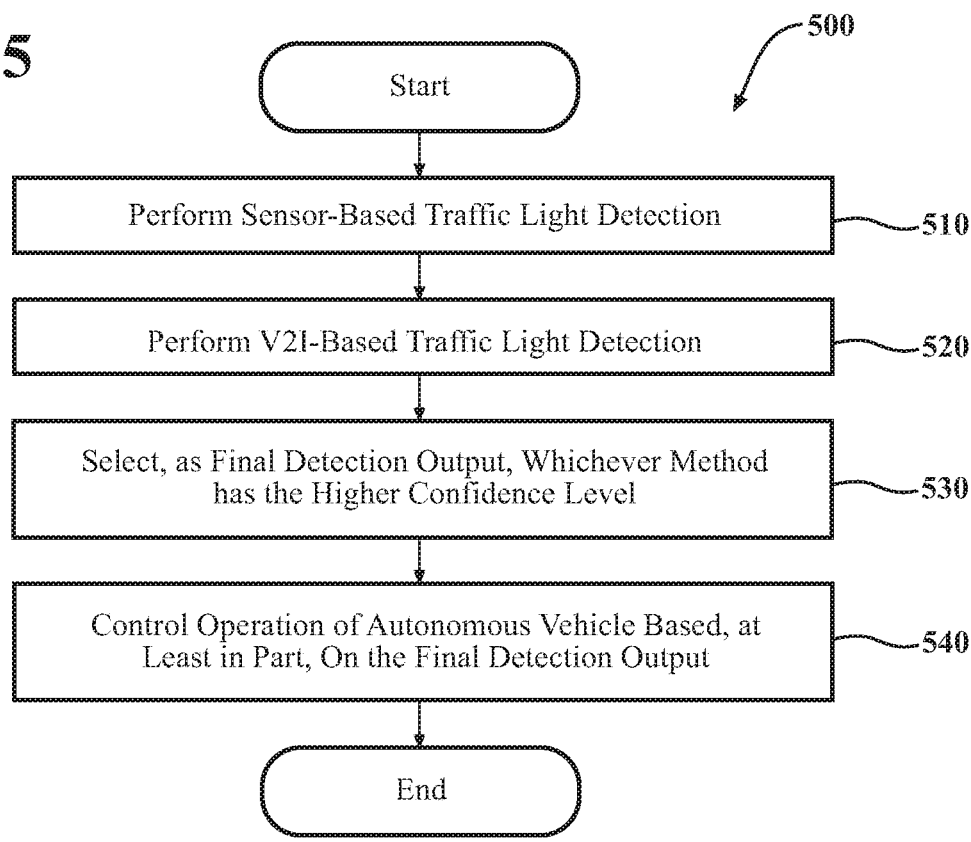
FIG. 5 is a flowchart of a method of controlling the operation of an autonomous vehicle, in accordance with an illustrative embodiment of the invention.

FIG. 5 is a flowchart of a method 500 of controlling the operation of an autonomous vehicle 100, in accordance with an illustrative embodiment of the invention. Method 500 will be discussed from the perspective of the traffic light detection system 170 in FIGS. 2 and 3. While method 500 is discussed in combination with traffic light detection system 170, it should be appreciated that method 500 is not limited to being implemented within traffic light detection system 170, but traffic light detection system 170 is instead one example of a system that may implement method 500.

At block 510, sensor-based traffic light detection module 315 causes the one or more processors 110 to perform traffic light detection at an intersection 400 using a sensor-based traffic light detector 220 to produce a sensor-based detection output 240 having an associated confidence level. As discussed above, in some embodiments, the sensor data 340 is image data associated with (e.g., depicting) the intersection 400 captured by one or more cameras 126, and sensor-based traffic light detector 220 detects traffic lights based on machine-vision techniques. For example, in one embodiment, sensor-based traffic light detector 220 uses a machine-learning-based bounding-box object detection algorithm that identifies the center point, width, and height of each visible "box" (signal) at the intersection 400 that houses one or more traffic lights. The algorithm also identifies the current state or phase (color) of the respective traffic lights associated with the possible transitions (paths through the intersection 400) and the type or category of each detected traffic light (e.g., simple traffic light, left-turn arrow, right-turn arrow, etc.). The algorithm correlates the detected traffic lights with HD map data 116 to match estimated traffic-light states with their corresponding lanes and transitions.

The algorithm also outputs a confidence level that measures the reliability and accuracy of the sensor-based detection output 240 (i.e., the estimated states or phases corresponding to the various transitions associated with the intersection 400). In one embodiment, the algorithm mentioned above is implemented using a one-stage fully convolutional neural network (CNN). The confidence level mentioned above is one of the outputs produced by the CNN, in such an embodiment. In other embodiments, more traditional object-detection algorithms can be used. For example, algorithms employing techniques such as semantic segmentation and instance segmentation can be used.

At block 520, V2I-based traffic light detection module 320 causes the one or more processors 110 to perform V2I-based traffic light detection at the same intersection 400 using a V2I-based traffic light detector 230 to produce a V2I-based detection output 250 having an associated confidence level. As discussed above, V2I-based traffic light detector 230 receives, via V2I signals 210, transitions 430, corresponding traffic-light states/phases, and, in some embodiments, timing information such as Signal Phase and Timing (SpaT) information (e.g., remaining seconds). As those skilled in the art are aware, each intersection 400 equipped with V2I capability includes an information system that transmits the V2I signals 210 to vehicles 100 in the vicinity. In some embodiments, the V2I signals 210 are communicated to the vehicles 100 via a short-range communication link such as Dedicated Short-Range Communications (DSRC) or Bluetooth Low Energy (BLE). Each intersection 400 typically has a unique identifier that can also be communicated to the vehicles 100 and correlated with HD map data 116. V2I-based traffic light detector 230 correlates the traffic-light information conveyed by the V2I signals 210 with the HD map data 116 to identify to which lanes the received transitions and traffic-light states/phases correspond. Based on this information and analysis, V2I-based traffic light detector 230 outputs a V2I-based detection output 250. V2I-based detection output 250 includes the various transitions associated with the intersection 400, their corresponding states, and, in some embodiments, timing information associated with at least some of the states.

As discussed above, how V2I-based traffic light detection module 320 assigns a confidence level to the V2I-based detection output 250 differs, depending on the particular embodiment. In one embodiment, an additional learning-based classifier compares V2I data 345 that the vehicle receives, via V2I signals 210, from the intersection's information system with the vehicle's sensor data 340 associated with the intersection 400 (e.g., images depicting the intersection 400). Such a comparison can reveal how consistent the V2I data 345 and the sensor data 340 are to spot incorrect V2I data 345. In another embodiment, past sensor-based detection output data (240) and past V2I-based detection output data (250) are processed using a learning-based classifier to assign a confidence level to the V2I-based detection output 250. As mentioned above, in some embodiments, these two techniques can be combined via a single learning-based classifier, or the outputs of two separate learning-based classifiers can be fused to output a single confidence-level value for the V2I-based detection output 250.

At block 530, fusion module 325 selects as the final traffic-light-detection output 270 whichever of the sensor-based detection output and the V2I-based detection output has the higher associated confidence level. As discussed above, in a variation of the embodiment in FIG. 5, fusion module 325 subjects the initial selection to additional override instructions based on consideration of the risk associated with a particular transition 430 through the intersection that the autonomous vehicle plans to execute. For example, in one embodiment, fusion module 325 decides to play it safe by slowing to a stop and not making a left-hand turn at an intersection 400 despite the V2I-based detection output 250 indicating a green traffic-light state for that transition with a confidence of 85%, where the sensor-based detection output 240 indicates a red state for that same transition with a confidence of 80%. In this example, traffic light detection system 170 trusts the detection output with the lower confidence level based on an assessment that a left turn has a relatively high associated risk (e.g., compared with a right turn). Thus, fusion module 325 overrides the usual decision that would have favored the detection output with the higher confidence level and instead chooses to trust the sensor-based detection output 240.

At block 540, control module 330 controls the operation of an autonomous vehicle 100 based, at least in part, on the final traffic-light-detection output 270. As discussed above, in some embodiments, control module 330 communicates final traffic light detection output 270 to one or more downstream components of the vehicle 100 that control autonomous driving, such as autonomous driving module(s) 160. Autonomous driving module(s) 160 can control, for example, the steering, acceleration, and braking of vehicle 100 in accordance with a path planner of a vehicle 100. For example, the path planner, in conjunction with navigation system 147, can decide to slow down and stop, proceed straight, or turn depending, at least in part, on the final traffic light detection output 270 provided via control module 330.

As discussed above, the final traffic-light-detection output 270 includes one or more transitions 430, the one or more transitions 430 corresponding to different possible paths through the intersection 400, and an estimated traffic-light state for each of the one or more transitions 430. In some embodiments, the final traffic-light-detection output 270 further includes timing information (e.g., SPaT data) for one or more traffic lights at the intersection 400 and an overall confidence level for the final traffic-light-detection output 270.

Figure 6:
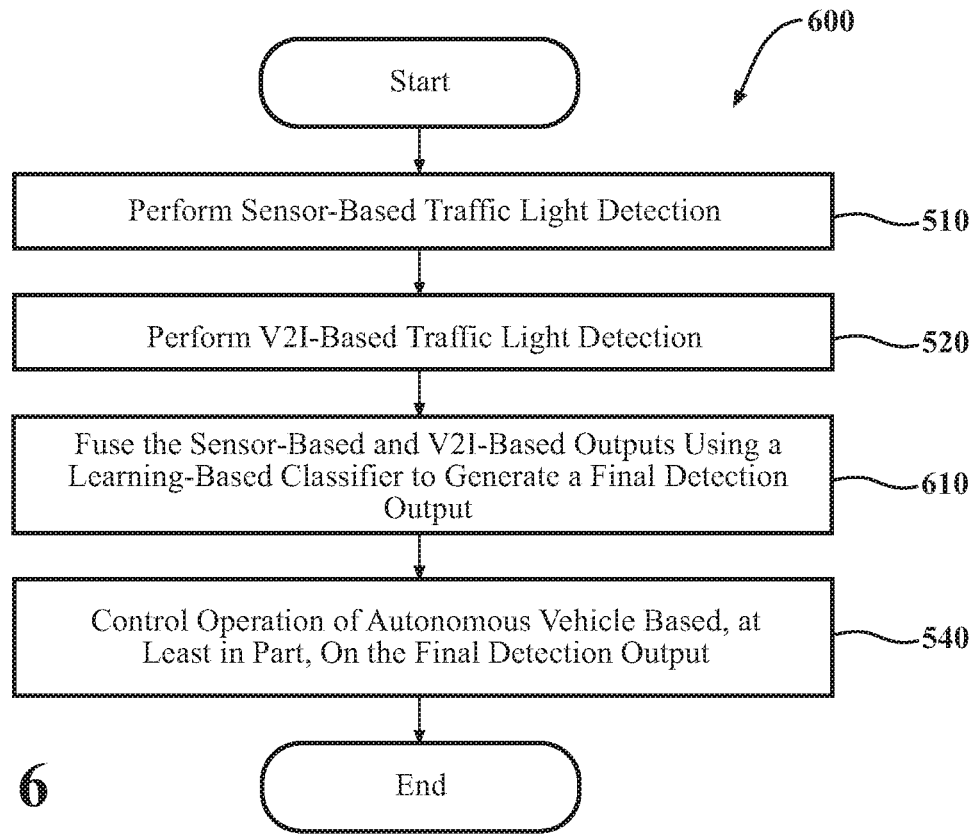
FIG. 6 is a flowchart of a method of controlling the operation of an autonomous vehicle, in accordance with another illustrative embodiment of the invention.

FIG. 6 is a flowchart of a method 600 of controlling the operation of an autonomous vehicle 100, in accordance with another illustrative embodiment of the invention. Method 600 will be discussed from the perspective of the traffic light detection system 170 in FIGS. 2 and 3. While method 600 is discussed in combination with traffic light detection system 170, it should be appreciated that method 600 is not limited to being implemented within traffic light detection system 170, but traffic light detection system 170 is instead one example of a system that may implement method 600.

Method 600 proceeds in method 500 at blocks 510, 520, and 540 discussed above. At block 610, fusion module 325 generates the final traffic-light-detection output by fusing the sensor-based detection output 240 and the V2I-based detection output 250 using a learning-based classifier. As discussed above, the learning-based classifier can be a DNN classifier, such as a fully convolutional neural network (CNN), or a non-DNN classifier, such as a SVM, depending on the particular embodiment. Fusion module 325 can also output an overall confidence level for the combined traffic-light-detection output (final traffic light detection output 270), as discussed above. As mentioned above, in some embodiments, the final traffic light detection output 270 includes state-timing information derived from SPaT data received via V2I communication.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for controlling operation of an autonomous vehicle, the system comprising:
   one or more processors; and
   a memory communicably coupled to the one or more processors and storing:
   a sensor-based traffic light detection module including instructions that when executed by the one or more processors cause the one or more processors to perform sensor-based traffic light detection at an intersection to produce a sensor-based detection output, the sensor-based detection output having an associated first confidence level;
   a vehicle-to-infrastructure-based (V2I-based) traffic light detection module including instructions that when executed by the one or more processors cause the one or more processors to perform V2I-based traffic light detection at the intersection to produce a V2I-based detection output, the V2I-based detection output having an associated second confidence level;
   a fusion module including instructions that when executed by the one or more processors cause the one or more processors to select as a final traffic-light-detection output whichever of the sensor-based detection output and the V2I-based detection output has a higher associated confidence level subject to an override based on consideration of a risk associated with a transition through the intersection that the autonomous vehicle plans to execute; and
   a control module including instructions that when executed by the one or more processors cause the one or more processors to control the operation of the autonomous vehicle based, at least in part, on the final traffic-light-detection output.

2. The system of claim 1, wherein the sensor-based traffic light detection module includes instructions to produce the sensor-based detection output by analyzing image data associated with the intersection.

3. The system of claim 1, wherein the V2I-based traffic light detection module includes instructions to compute the associated second confidence level, at least in part, by comparing V2I signals received from an information system of the intersection with environmental sensor data associated with the intersection using a learning-based classifier.

4. The system of claim 1, wherein the V2I-based traffic light detection module includes instructions to compute the associated second confidence level, at least in part, by processing past sensor-based detection output data and past V2I-based detection output data using a learning-based classifier.

5. The system of claim 1, wherein the instructions in the control module to control the operation of the autonomous vehicle based, at least in part, on the final traffic-light-detection output include instructions to control one or more of steering, acceleration, and braking.

6. The system of claim 1, wherein the final traffic-light-detection output includes one or more transitions, the one or more transitions corresponding to different possible paths through the intersection, and an estimated traffic light state for each of the one or more transitions.

7. The system of claim 6, wherein the final traffic-light-detection output further includes state-timing information for at least one traffic light at the intersection and an overall confidence level for the final traffic-light-detection output.

8. A non-transitory computer-readable medium for controlling operation of an autonomous vehicle and storing instructions that when executed by one or more processors cause the one or more processors to:
   perform sensor-based traffic light detection at an intersection to produce a sensor-based detection output, the sensor-based detection output having an associated first confidence level;
   perform vehicle-to-infrastructure-based (V2I-based) traffic light detection at the intersection to produce a V2I-based detection output, the V2I-based detection output having an associated second confidence level;
   select as a final traffic-light-detection output whichever of the sensor-based detection output and the V2I-based detection output has a higher associated confidence level subject to an override based on consideration of a risk associated with a transition through the intersection that the autonomous vehicle plans to execute; and
   control the operation of the autonomous vehicle based, at least in part, on the final traffic-light-detection output.

9. The non-transitory computer-readable medium of claim 8, wherein the instructions include instructions to compute the associated second confidence level, at least in part, by comparing V2I signals received from an information system of the intersection with environmental sensor data associated with the intersection using a learning-based classifier.

10. The non-transitory computer-readable medium of claim 8, wherein the instructions include instructions to compute the associated second confidence level, at least in part, by processing past sensor-based detection output data and past V2I-based detection output data using a learning-based classifier.

11. The non-transitory computer-readable medium of claim 8, wherein the final traffic-light-detection output includes one or more transitions, the one or more transitions corresponding to different possible paths through the intersection, and an estimated traffic light state for each of the one or more transitions.

12. The non-transitory computer-readable medium of claim 11, wherein the final traffic-light-detection output further includes state-timing information for at least one traffic light at the intersection and an overall confidence level for the final traffic-light-detection output.

13. A method of controlling operation of an autonomous vehicle, the method comprising:
    performing traffic light detection at an intersection using a sensor-based traffic light detector to produce a sensor-based detection output, the sensor-based detection output having an associated first confidence level;

performing traffic light detection at the intersection using a vehicle-to-infrastructure-based (V2I-based) traffic light detector to produce a V2I-based detection output, the V2I-based detection output having an associated second confidence level;

selecting as a final traffic-light-detection output whichever of the sensor-based detection output and the V2I-based detection output has a higher associated confidence level subject to an override based on consideration of a risk associated with a transition through the intersection that the autonomous vehicle plans to execute; and controlling the operation of the autonomous vehicle based, at least in part, on the final traffic-light-detection output.

14. The method of claim 13, wherein the associated second confidence level is computed, at least in part, by comparing V2I signals received from an information system of the intersection with environmental sensor data associated with the intersection using a learning-based classifier.

15. The method of claim 13, wherein the associated second confidence level is computed, at least in part, by processing past sensor-based detection output data and past V2I-based detection output data using a learning-based classifier.

16. The method of claim 13, wherein the final traffic-light-detection output includes one or more transitions, the one or more transitions corresponding to different possible paths through the intersection, and an estimated traffic light state for each of the one or more transitions.

17. The method of claim 16, wherein the final traffic-light-detection output further includes timing information for at least one traffic light at the intersection and an overall confidence level for the final traffic-light-detection output.

* * * * *